W. W. HAUGHEY.
PROCESS OF TREATING DISTILLERY BY-PRODUCTS.
APPLICATION FILED NOV. 11, 1916.
1,232,446.
Patented July 3, 1917.
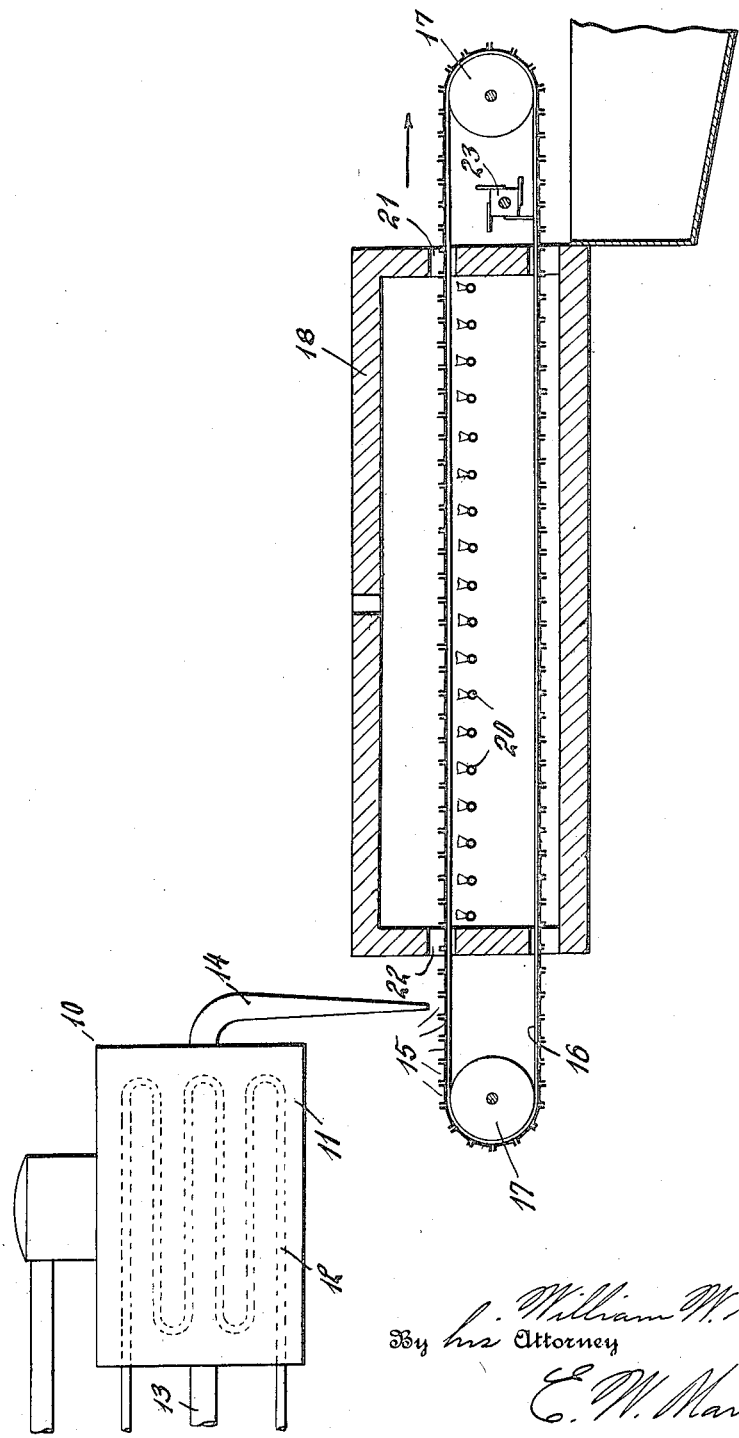
Inventor
William W. Haughey
By his Attorney
E. W. Marshall

UNITED STATES PATENT OFFICE.

WILLIAM W. HAUGHEY, OF GARDEN CITY, NEW YORK, ASSIGNOR TO BY-PRODUCTS RECLAIMING CORPORATION, OF NEW YORK, N. Y., A CORPORATION OF NEW YORK.

PROCESS OF TREATING DISTILLERY BY-PRODUCTS.

1,232,446. Specification of Letters Patent. Patented July 3, 1917.

Application filed November 11, 1916. Serial No. 130,717.

*To all whom it may concern:*

Be it known that I, WILLIAM W. HAUGHEY, a citizen of the United States, and a resident of Garden City, county of Nassau, and State of New York, have invented certain new and useful Improvements in Processes of Treating Distillery By-Products, of which the following is a specification, reference being had to the accompanying drawings, forming a part thereof.

My invention relates to fertilizers or compounds which are adapted to be mechanically mixed with other ingredients in the production of commercial fertilizer. It has special reference to the reclamation of cane or beet molasses after fermentation and distillation in the manufacture of alcohol and alcoholic liquors, or more specifically to the conversion of distillery slops into fertilizer material without loss of valuable ingredients.

Distillery slops generally contain about 94% water, although this liquid as delivered from some distilleries, may contain as low as 60%. The solid matter is held in solution and comprises from 8 to 12% potassium compounds, such as carbonate of potassium, chlorid of potassium, and sulfate of potassium and a considerable quantity of albuminoids and proteins which are rich in nitrogen.

If the material is heated to high temperatures, it is found that the resulting solid contains no appreciable quantity of nitrogen and while it contains potassium compounds and is of some value for fertilizer, the nitrogen which is also valuable, is lost.

One object of my invention is to provide a process of treating distillery slops by which a fertilizer material or fertilizer base may be produced which shall retain substantially the full percentage of nitrogen and which at the same time shall be substantially non-hydroscopic.

In my copending application Serial No. 130,716 filed of even date herewith, I have shown and described a process for the same general purpose as the aforesaid, and it is the aim of my present invention to provide another process which may be economically practised by use of relatively simple and compact apparatus.

In order that my invention may be thoroughly understood, I will now proceed to describe the same in the following specification, and then point out the novel features thereof in appended claims.

The single figure of the accompanying drawings is a diagrammatic view showing suitable apparatus for practising the process of my invention.

10 designates an evaporator of any well known type which may for example comprise a box or chest 11 in which is a steam coil 12 and to which the distillery slops may be supplied through an inlet pipe 13. The concentrated liquid is discharged from an outlet 14 onto shallow trays or plates 15 on an endless belt conveyer 16. This conveyer belt is mounted on guide pulleys 17 and extends through a furnace or oven 18 which is provided with a plurality of distributed heaters 20. The trays or plates thus carry thin films of liquid into the furnace.

The heaters 20 may be of any suitable type such as, for example, gas burners, and are regulated so that the amount of heat is sufficient to evaporate the water from the films and gradually increase the temperature of the residue up to a predetermined critical maximum, which I have found to be about 700° F.

By this means the temperature of the material in the trays 15 is graded and is gradually increased to a predetermined maximum which is sufficient to render the material non-hydroscopic without driving off the nitrogen.

Various modifications may be effected within the spirit and scope of my invention, and I intend that only such limitations be imposed as are indicated in the appended claims.

What I claim is:

1. The process of treating distillery slops for the production of fertilizer material that consists in continuously applying heat to concentrate the solution, evaporate the water, and gradually increase the temperature of the residue to a predetermined maximum sufficient to render the material non-hydroscopic without driving off the nitrogen.

2. The process of treating distillery slops for the production of fertilizer material that consists in concentrating the solution, evaporating thin films of the concentrated solution, and gradually increasing the temperature of the residue to a predetermined critical maximum, sufficient to render the material non-hydroscopic without driving off the nitrogen.

3. The process of treating distillery slops for the production of fertilizer material that consists in concentrating the solution and passing a thin film of the concentrated solution through an oven arranged to gradually evaporate the water and increase the temperature of the residue to a predetermined critical maximum, sufficient to render the material non-hydroscopic without driving off the nitrogen, as the material approaches the outlet end.

4. The process of treating distillery slops for the production of fertilizer material that consists in concentrating the solution and passing a thin film of the concentrated solution through an oven arranged to evaporate the water and to gradually increase the temperature of the residue to a predetermined critical maximum temperature of about 700° F., as the material approaches the outlet end.

5. The process of treating distillery slops for the production of fertilizer material that consists in continuously applying heat to evaporate the water and gradually increase the temperature of the residue to a predetermined critical maximum, sufficient to render the material non-hydroscopic without driving off the nitrogen.

In witness whereof I have hereunto set my hand this 10 day of November, 1916.

WILLIAM W. HAUGHEY.